US011805393B2

United States Patent
Nakagawa et al.

(10) Patent No.: US 11,805,393 B2
(45) Date of Patent: Oct. 31, 2023

(54) METHOD FOR AGGREGATION AND CALCULATION OF A POPULATION DISTRIBUTION OF DEVICES OVER A PREDETERMINED GEOGRAPHIC AREA

(71) Applicant: NTT DOCOMO, INC., Chiyoda-ku (JP)

(72) Inventors: Tomohiro Nakagawa, Chiyoda-ku (JP); Takuya Doumen, Chiyoda-ku (JP); Kazuya Sasaki, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 326 days.

(21) Appl. No.: 17/281,467

(22) PCT Filed: Jul. 16, 2019

(86) PCT No.: PCT/JP2019/027969
§ 371 (c)(1),
(2) Date: Mar. 30, 2021

(87) PCT Pub. No.: WO2020/095480
PCT Pub. Date: May 14, 2020

(65) Prior Publication Data
US 2022/0007143 A1    Jan. 6, 2022

(30) Foreign Application Priority Data
Nov. 6, 2018  (JP) .................................. 2018-209074

(51) Int. Cl.
*H04W 4/029* (2018.01)
*H04W 4/021* (2018.01)
(Continued)

(52) U.S. Cl.
CPC ........... *H04W 4/029* (2018.02); *H04W 4/021* (2013.01); *H04W 4/025* (2013.01); *H04W 84/042* (2013.01); *H04W 84/18* (2013.01)

(58) Field of Classification Search
CPC ....... H04W 4/029; H04W 4/021; H04W 4/02; H04W 4/025; H04W 84/042;
(Continued)

(56) References Cited

U.S. PATENT DOCUMENTS

2013/0137458 A1*  5/2013  Gogic ................. H04W 64/006
2014/0248899 A1*  9/2014  Emadzadeh et al. ... H04W 4/02
(Continued)

FOREIGN PATENT DOCUMENTS

JP        2003-30373 A       1/2003
JP    WO 2012105377 A1 *  8/2012  ............ H04W 4/021

OTHER PUBLICATIONS

Position Information Totalizing Apparatus and Position Information Totalizing Method; WO 2010116938 A1 (Year: 2010).*
(Continued)

*Primary Examiner* — Meless N Zewdu
(74) *Attorney, Agent, or Firm* — Oblon, McClelland, Maier & Neustadt, L.L.P.

(57) ABSTRACT

An object is to provide a population distribution aggregation calculation device which can calculate a population distribution of high accuracy.
A population distribution aggregation calculation device includes a narrow-area mesh group management unit 108 configured to generate wide-area mesh data by acquiring the number of user terminals positioned in each predefined wide-area mesh using approximate positional information of a user terminal 200, and to generate narrow-area mesh data by acquiring the number of user terminals positioned in each of a plurality of narrow-area meshes obtained by dividing a
(Continued)

wide-area mesh by a predetermined geographic resolution for each predetermined positional information acquisition pattern using detailed positional information stored in the positioning data accumulation unit 102, a reliability evaluation unit 109 configured to calculate reliability of narrow-area mesh data for each positional information acquisition pattern on the basis of wide-area mesh data and narrow-area mesh data, and a population distribution estimation unit 110 configured to estimate the number of terminals in a narrow-area mesh on the basis of the narrow-area mesh data and the wide-area mesh data according to the reliability.

16 Claims, 11 Drawing Sheets

(51) Int. Cl.
*H04W 4/02* (2018.01)
*H04W 84/04* (2009.01)
*H04W 84/18* (2009.01)

(58) Field of Classification Search
CPC ......... H04W 84/18; H04W 4/08; H04W 4/21; H04W 4/23; H04W 4/30; H04W 4/38; H04W 88/00; H04W 88/02; H04W 12/64; H04W 68/04; H04W 68/00; H04W 64/00; H04W 28/095; H04W 92/18; H04W 12/63; G06Q 50/10; H04M 3/42; G06F 16/487; G06F 16/587; G06F 16/687; G06F 16/787

See application file for complete search history.

(56) References Cited

U.S. PATENT DOCUMENTS

2014/0302773 A1* 10/2014 Jantunen et al. ..... H04W 8/005
2015/0100373 A1* 4/2015 Ignatyev et al. ... G06Q 30/0201

OTHER PUBLICATIONS

International Preliminary Report on Patentability and Written Opinion dated May 20, 2021 in PCT/JP2019/027969 (submitting English translation only), 6 pages.
International Search Report dated Oct. 15, 2019 in PCT/JP2019/027969 filed Jul. 16, 2019.

* cited by examiner

Fig. 3

(a) POSITIONING DATA MEASURED ON TERMINAL SIDE

| TIME STAMP | USER ID | LATITUDE | LONGITUDE | OS | OS VERSION | APPLICATION NAME | APPLICATION VERSION | TYPE | POSITIONING MEANS | POSITIONING ACCURACY |
|---|---|---|---|---|---|---|---|---|---|---|
| 09-19 01:41:01 | 11111111 | 35.609897 | 139.742546 | Android | 6.0 | AAA | 1.0 | AAA | GPS | 200m |
| 09-19 01:41:01 | 22222222 | 35.605345 | 139.746457 | iOS | 10.0 | BBB | 2.0 | BBB | GPS | 1000m |
| 09-19 01:41:01 | 33333333 | 35.606536 | 139.747657 | Android | 6.0 | CCC | 3.0 | CCC | WiFi | 200m |
| 09-19 01:41:01 | 44444444 | 35.605463 | 139.746346 | iOS | 10.0 | DDD | 4.0 | BBB | Beacon | 10m |

ATTRIBUTE PORTION OF POSITIONING DATA (b) POSITIONING DATA MEASURED ON NETWORK SIDE

| TIME STAMP | USER ID | LATITUDE | LONGITUDE |
|---|---|---|---|
| 09-19 01:41:01 | 55555555 | 35.534666 | 139.745676 |
| 09-19 01:41:01 | 66666666 | 35.607657 | 139.748768 |
| 09-19 01:41:01 | 77777777 | 35.608568 | 139.748568 |
| 09-19 01:41:01 | 88888888 | 35.607547 | 139.748658 |

Fig.4

RESOLUTION MANAGEMENT TABLE 107

| RESOLUTION ID | TEMPORAL RESOLUTION | GEOGRAPHIC RESOLUTION |
|---|---|---|
| 000000001 | ONE MONTH | 100m |
| 000000002 | ONE MONTH | 50m |
| 000000003 | ONE MONTH | 25m |
| ⋮ | ⋮ | ⋮ |
| 000000011 | ONE WEEK | 100m |
| ⋮ | ⋮ | ⋮ |
| 000000021 | ONE DAY | 100m |
| ⋮ | ⋮ | ⋮ |

*Fig.5*

NARROW-AREA MESH GROUP MANAGEMENT TABLE 108a

| NARROW-AREA MESH GROUP ID | OS | ... |
|---|---|---|
| 000000001 | Android | |
| 000000002 | iOS | |
| 000000003 | | |
| ⋮ | | |

Fig.6

(a) NARROW-AREA MESH DATA MANAGEMENT TABLE 108b

| NARROW-AREA MESH GROUP ID | RESOLUTION ID | NARROW-AREA MESH ID | NUMBER OF USER TERMINAL |
|---|---|---|---|
| 000000001 | 000000001 | 000000001 | 545 |
| 000000001 | 000000001 | 000000002 | 235 |
| 000000001 | 000000001 | 000000003 | 135 |

(b) WIDE-AREA MESH DATA MANAGEMENT TABLE 108c

| WIDE-AREA MESH ID | NUMBER OF USER TERMINAL |
|---|---|
| 000000001 | 5435 |
| 000000002 | 2345 |
| 000000003 | 354 |
| 000000004 | 3436 |

Fig. 7

(a) GROUP 1 FOR NARROW-AREA MESH DATA: A, GPS

| 15 | 11 | 1  | 22 | 23 | 36 |
|----|----|----|----|----|----|
| 18 | 7  | 6  | 14 | 21 | 26 |
| 1  | 2  | 17 | 22 | 40 | 24 |
| 2  | 1  | 21 | 30 | 18 | 37 |
| 36 | 21 | 23 | 13 | 23 | 36 |
| 29 | 14 | 21 | 18 | 35 | 33 |

(b) GROUP 2 FOR NARROW-AREA MESH DATA: A, WiFi

| 37 | 31 | 3  | 7  | 2  | 6  |
|----|----|----|----|----|----|
| 11 | 44 | 4  | 9  | 8  | 8  |
| 30 | 22 | 7  | 52 | 1  | 1  |
| 1  | 19 | 29 | 8  | 1  | 1  |
| 55 | 18 | 9  | 4  | 8  | 24 |
| 28 | 1  | 21 | 12 | 38 | 18 |

(c) GROUP 3 FOR NARROW-AREA MESH DATA: B, GPS

| 20 | 25 | 21 | 18 | 6  | 7  |
|----|----|----|----|----|----|
| 28 | 4  | 10 | 12 | 9  | 4  |
| 49 | 19 | 47 | 40 | 24 | 28 |
| 11 | 30 | 11 | 2  | 13 | 27 |
| 24 | 18 | 33 | 30 | 8  | 19 |
| 16 | 25 | 2  | 11 | 18 | 25 |

(d) GROUP 4 FOR NARROW-AREA MESH DATA: B, WiFi

| 10 | 17 | 6 | 16 | 6  | 23 |
|----|----|---|----|----|----|
| 8  | 31 | 6 | 32 | 19 | 16 |
| 10 | 5  | 0 | 4  | 0  | 1  |
| 21 | 3  | 8 | 15 | 0  | 1  |
| 3  | 3  | 3 | 5  | 2  | 4  |
| 0  | 0  | 5 | 8  | 4  | 0  |

(e) WIDE-AREA MESH DATA

| 5868 | 5816 | 4851 |
|------|------|------|
| 5637 | 3236 | 250  |
| 1369 | 2609 | 1792 |

US 11,805,393 B2

METHOD FOR AGGREGATION AND CALCULATION OF A POPULATION DISTRIBUTION OF DEVICES OVER A PREDETERMINED GEOGRAPHIC AREA

TECHNICAL FIELD

The present invention relates to a population distribution aggregation calculation device that totals positional information of user terminals.

BACKGROUND ART

In Patent Literature 1 below, it is described that a population distribution of users carrying mobile terminals is analyzed to analyze a population distribution of a target area.

CITATION LIST

Patent Literature

[Patent Literature 1] Japanese Unexamined Patent Publication No. 2003-30373

SUMMARY OF INVENTION

Technical Problem

However, in Patent Literature 1, it is not possible to calculate a population distribution with high geographic resolution while securing statistical reliability. That is, in the technology described in Patent Literature 1, there is a problem that positional information of user terminals is totaled without considering characteristics of position positioning by the user terminals themselves and positioning means thereof, which impairs statistical reliability thereof.

Therefore, to solve the problem described above, an object of the present invention is to provide a population distribution aggregation calculation device capable of calculating a population distribution with high geographic resolution while maintaining statistical reliability.

Solution to Problem

A population distribution aggregation calculation device of the present invention includes a narrow area data generation unit configured to generate narrow area data by acquiring the number of user terminals positioned in each of a plurality of narrow areas obtained by dividing a predefined wide area by a predetermined geographic resolution for each predetermined positional information acquisition pattern using positional information indicating a position of a corresponding user terminal measured by a plurality of user terminals, a reliability calculation unit configured to calculate reliability of the narrow area data for each positional information acquisition pattern on the basis of wide area data indicating the number of user terminals positioned in each wide area and the narrow area data, and a population estimation unit configured to estimate the number of terminals in the narrow area on the basis of the narrow area data and the wide area data according to the reliability.

With this configuration, it is possible to generate narrow-area mesh data for each predetermined positional information acquisition pattern and to evaluate reliability of the narrow-area mesh data on the basis of the narrow-area mesh data and wide-area mesh data. Therefore, it is possible to select narrow-area mesh data with higher statistical reliability, and to estimate a population distribution of a narrow-area mesh using the data with high accuracy.

Advantageous Effects of Invention

According to the present invention, it is possible to calculate a population distribution with a high geographic resolution and statistical reliability.

BRIEF DESCRIPTION OF DRAWINGS

FIGS. 3A-3B are each a diagram which shows a specific example of terminal positioning data measured by a user terminal 200 and schematic positioning data measured in a network.

FIG. 4 is a diagram which shows a specific example of a management table in which a geographic resolution and a temporal resolution are associated with a resolution ID.

FIG. 5 is a diagram which shows a specific example of a narrow-area mesh group management table.

FIGS. 6A-6B are each a diagram which shows a specific example of a narrow-area mesh data management table and a wide-area mesh management table.

FIGS. 7A-7E are each a schematic diagram which schematically shows narrow-area mesh data and wide-area mesh data.

DETAILED DESCRIPTION OF THE INVENTION

Figure 1:
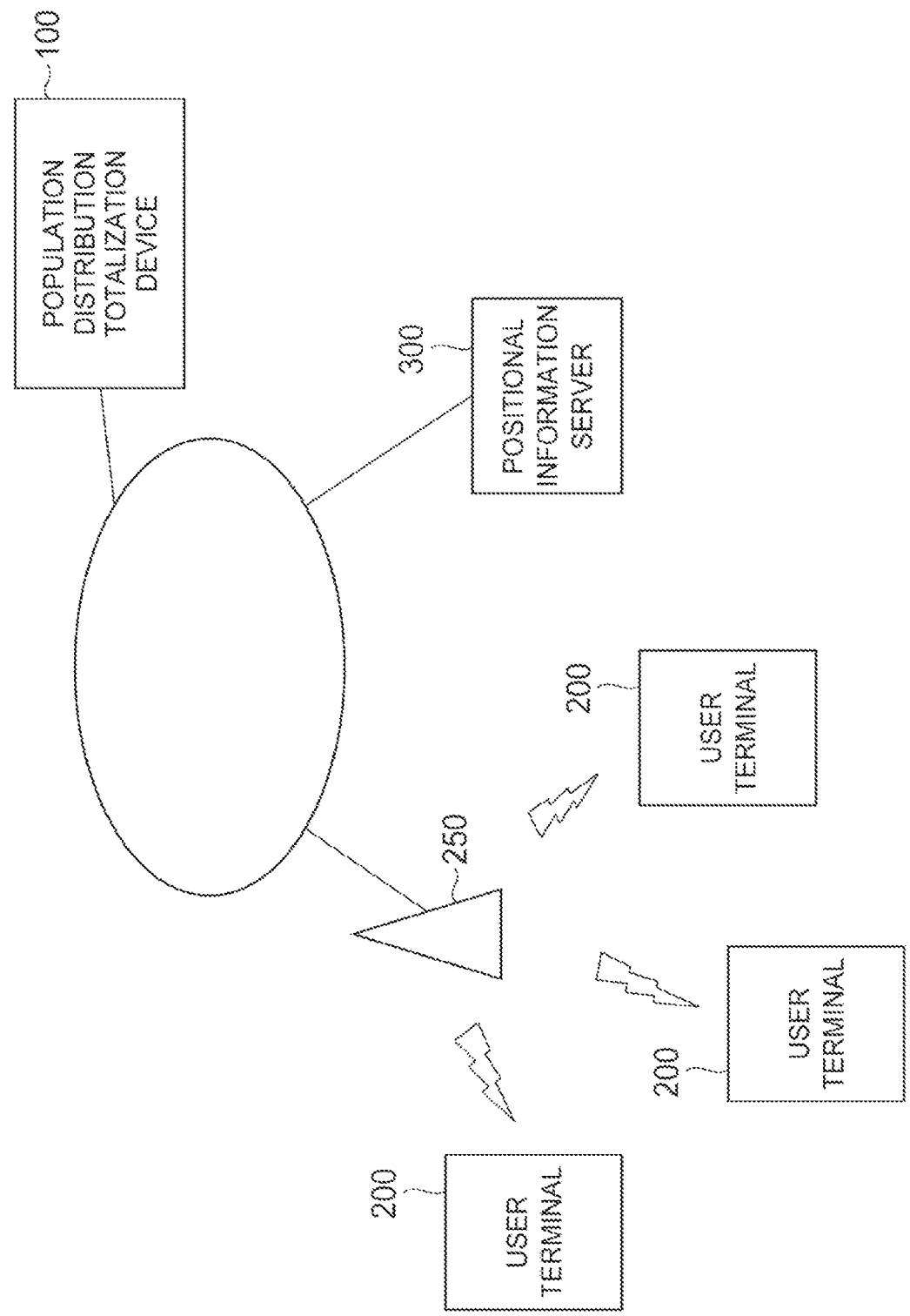
FIG. 1 is a diagram which shows a system configuration of a communication system including a population distribution totalization device 100 of the present embodiment.

An embodiment of the present disclosure will be described with reference to the accompanying drawings. When possible, the same parts will be denoted by the same reference numerals, and overlapping description thereof will be omitted.

FIG. 1 is a diagram which shows a system configuration of a communication system including a population distribution totalization device 100 according to an embodiment of the present disclosure. As show in FIG. 1, the communication system is configured to include a population distribution totalization device 100, a user terminal 200, a base station 250, and a positional information server 300. The user terminal 200 is, for example, a mobile phone or a smartphone that performs communication using a mobile communication network. The user terminal 200 performs wireless communication with the base station 250 and communicates with the Internet or another communication terminal via a network.

The positional information server 300 is a server that manages a position of the user terminal 200. This positional information server 300 is a server that is owned by a telecommunications carrier of a mobile communication network to which the user terminal 200 has subscribed, and is a server that manages the position of the user terminal 200. The positional information server 300 acquires and stores an approximate position at which the user terminal 200 is located in the base station 250.

In addition, the user terminal 200 acquires positional information of high accuracy by performing GPS positioning, and transmits the information to the population distribution totalization device 100 or the positional information server 300.

The population distribution totalization device 100 calculates a population distribution in a narrow-area mesh and a wide-area mesh on the basis of approximate positional information of each user terminal 200 stored by the positional information server 300 and definite positional information obtained by the user terminal 200 performing GPS positioning.

Figure 2:
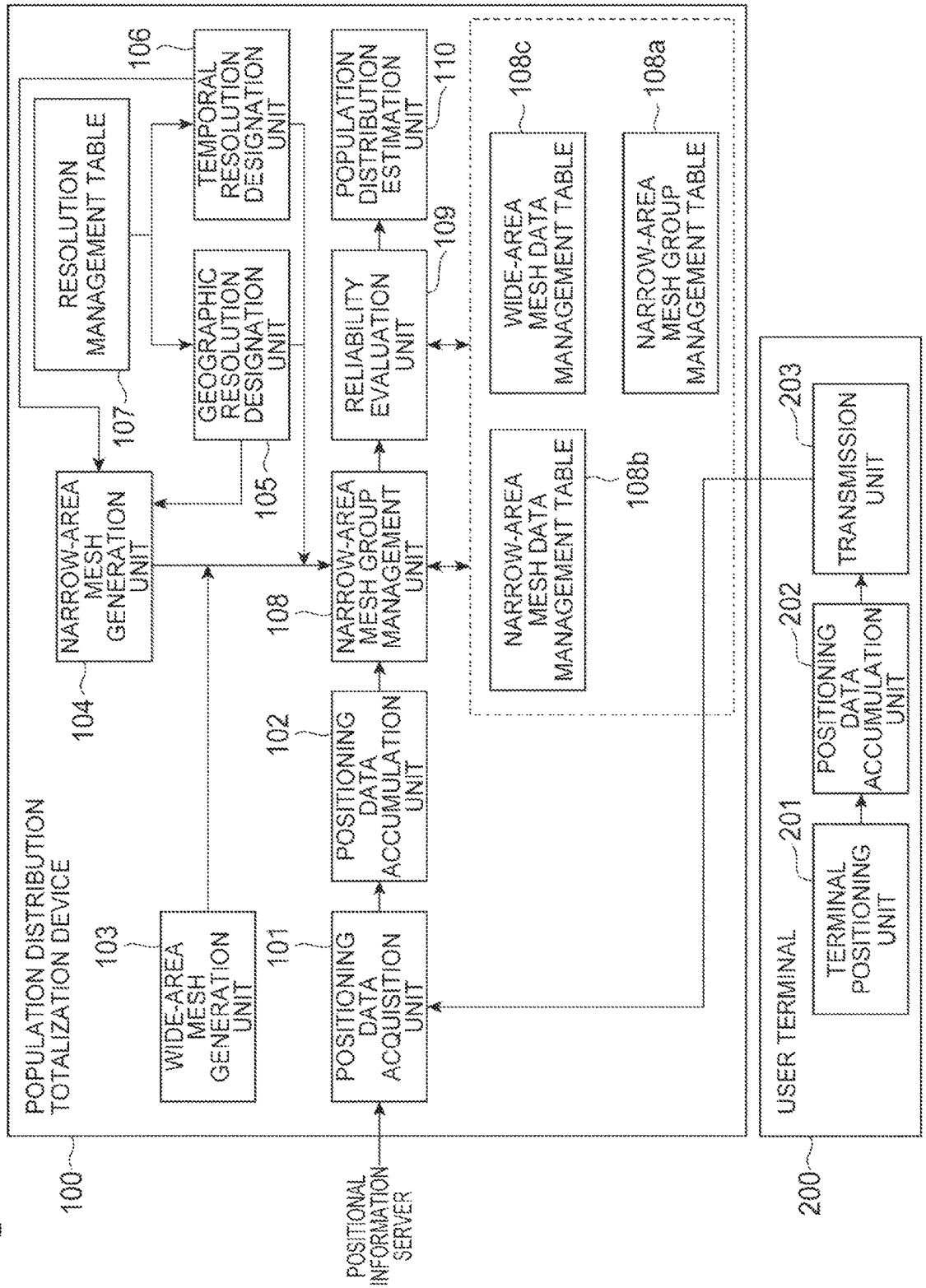
FIG. 2 is a block diagram which shows a functional configuration of the population distribution totalization device 100.

Next, a functional configuration of the population distribution totalization device 100 will be described. FIG. 2 is a block diagram which shows a functional configuration of the population distribution totalization device 100. As shown in FIG. 2, the population distribution totalization device 100 is configured to include a positioning data acquisition unit 101 (a first positional information acquisition unit, a second positional information acquisition unit), a positioning data accumulation unit 102 (a positional information storage unit), a wide-area mesh generation unit 103, a narrow-area mesh generation unit 104, a geographic resolution designation unit 105, a temporal resolution designation unit 106, a resolution management table 107, a narrow-area mesh group management unit 108 (a wide area data generation unit, a narrow area data generation unit), a narrow-area mesh group management table 108a, a narrow-area mesh data management table 108b, a wide-area mesh data management table 108c, a reliability evaluation unit 109 (a reliability calculation unit), and a population distribution estimation unit 110 (a population estimation unit). In addition, the user terminal 200 that communicates with this population distribution totalization device 100 is configured to include a terminal positioning unit 201, a positioning data accumulation unit 202, and a transmission unit 203. Hereinafter, the population distribution totalization device 100 will be described.

The positioning data acquisition unit 101 is a portion that acquires approximate positional information (second positional information) of the user terminal 200 obtained by communicating with the base station 250 in which the user terminal 200 is located. Note that, in the positional information of a user, positional information of the base station 250 or a center position of a cell formed by the base station 250 may be set as the approximate positional information (second positional information) of the user terminal 200 by the communication. In addition to the above description, the positional information of the user terminal 200 can be roughly acquired in the network. The approximate positional information is information stored in the positional information server 300, and the positioning data acquisition unit 101 acquires the approximate positional information from this positional information server 300. Moreover, the positioning data acquisition unit 101 acquires detailed positional information such as GPS positional information transmitted from the user terminal 200.

The positioning data accumulation unit 102 is a portion which stores positioning data including approximate positional information acquired by the positioning data acquisition unit 101 or GPS positional information (definite positional information (first positional information)) transmitted from the user terminal 200.

FIG. 3(*a*) is a diagram which shows a specific example of positioning data (terminal positioning data) acquired by the user terminal 200 among the positioning data. As shown in FIG. 3(*a*), the positioning data includes a time stamp, a user ID, coordinate information (latitude and longitude), and attribute information (an OS, an OS version, a positioning application name, version information, a user terminal model name, a positioning type, and a positioning accuracy of a corresponding user terminal) of positioning data in association with each other. The positioning data can be narrowed down by setting the attribute information of the positioning data as a key.

FIG. 3(*b*) is a diagram which shows a specific example of the positioning data (schematic positioning data) acquired by the positioning data acquisition unit 101 among the positioning data. As shown in FIG. 3(*b*), the positioning data includes a time stamp, a user ID, and coordinate information (latitude and longitude) associated with each other.

The wide-area mesh generation unit 103 is a portion that divides map information by a predetermined wide-area division pattern and generates a plurality of wide-area meshes (wide areas).

The narrow-area mesh generation unit 104 is a portion that further divides the wide-area mesh generated by the wide-area mesh generation unit 103 by a predetermined narrow-area division pattern and generates a narrow-area mesh (a narrow area). This narrow-area division pattern is defined on the basis of a geographic resolution to be described below.

The geographic resolution designation unit 105 is a portion that designates a size (resolution) of the narrow-area division pattern of the narrow-area mesh generation unit 104. For example, it designates that a narrow-area mesh is divided by a division pattern of 100 m×100 m, or the like. This designation is performed by an operation of a user.

The temporal resolution designation unit 106 is a portion that designates granularity of a temporal totalization unit of the positional information in the narrow-area mesh group management unit 108. For example, the temporal resolution designation unit 106 designates the granularity in units of time to total the number of pieces of positional information (that is, the number of terminals) such as the number of pieces of positional information per hour or the number of pieces of positional information per day. This granularity is set on the basis of a temporal resolution defined in the resolution management table 107.

The resolution management table 107 is a portion in which a geographic resolution and a temporal resolution are described in association with a resolution ID. The resolution management table 107 is referred to when the geographic resolution designation unit 105 and the temporal resolution designation unit 106 designate a geographical or temporal resolution. FIG. 4 is a specific example of this management table. For example, for the resolution ID000000001, one month is defined as the temporal resolution and 100 m is defined as the geographic resolution. This geographic resolution indicates the size of the narrow-area mesh, and a narrow-area mesh is generated with a division pattern of 100 m×100 m when a narrow-area mesh group to be described below is generated. In addition, this temporal resolution indicates that an acquisition time unit of the number of pieces of the positional information (the number of terminals) is set to a unit of one month. An operator can designate a geographic resolution and a temporal resolution by designating a resolution ID with reference to this management table.

The narrow-area mesh group management unit 108 is a portion that generates a narrow-area mesh group and narrow-area mesh data thereof to be pre-processed to calculate a high-definition population distribution in units of wide-area mesh on the basis of an output from each of the wide-area mesh generation unit 103, the narrow-area mesh generation unit 104, the geographic resolution designation unit 105, the temporal resolution designation unit 106, and the positioning data accumulation unit 102. Here, the narrow-area mesh data indicates the number of user terminals (corresponding to the number of pieces of positional information) in each narrow-area mesh. The narrow-area mesh group is determined on the basis of attribute information of the positioning data.

For example, the narrow-area mesh group management unit 108 acquires positioning data from the positioning data accumulation unit 102, and groups the data on the basis of an OS type and/or positioning type.

FIG. 5 shows a specific example of the narrow-area mesh group management table 108a in which narrow-area mesh groups are described. As shown in FIG. 5, a narrow-area mesh group ID is assigned for each narrow-area mesh group ID in association with a combination of the OS type and the positioning type.

The narrow-area mesh group management unit 108 calculates the narrow-area mesh data for each narrow-area mesh by totaling the number of records of the positioning data in a grouped unit.

FIG. 6(a) shows a specific example of the narrow-area mesh data management table 108b in which the narrow-area mesh data is described. As shown in FIG. 6(a), the narrow-area mesh data is data which includes a narrow-area mesh group ID, a resolution ID, a narrow-area mesh ID, and the number of user terminals in association with each other. The narrow-area mesh group management unit 108 stores these types of information for each narrow-area mesh group.

In addition, the narrow-area mesh group management unit 108 calculates wide-area mesh data for each wide-area mesh by totaling the number of records of the positioning data in units of wide-area mesh.

FIG. 6(b) shows a specific example of the wide-area mesh data management table 108c in which wide-area mesh data is described. As shown in FIG. 6(b), the wide-area mesh data includes a wide-area mesh ID and the number of user terminals in association with each other.

The reliability evaluation unit 109 is a portion that evaluates the narrow-area mesh data for each narrow-area mesh group generated by the narrow-area mesh group management unit 108. For example, the reliability evaluation unit 109 calculates a correlation between narrow-area mesh groups on the basis of narrow-area mesh data in narrow-area mesh groups to determine which narrow-area mesh group generated by the narrow-area mesh group management unit 108 to adopt. Furthermore, the reliability evaluation unit 109 calculates a correlation coefficient between narrow-area mesh data based on one or more adopted narrow-area mesh groups and wide-area mesh data in a wide-area mesh to evaluate the narrow-area mesh groups. As the correlation coefficient with the wide-area mesh data increases, the evaluation becomes higher.

The population distribution estimation unit 110 calculates a ratio of the number of terminals for each narrow-area mesh unit using the narrow-area mesh data, and applies the wide-area mesh data in units of wide-area mesh unit to the ratio of the number of terminals to a narrow-area mesh, thereby calculating a population distribution in units of narrow-area mesh.

Next, a specific example of reliability evaluation performed by the reliability evaluation unit 109 will be described. FIG. 7 shows a specific example of narrow-area mesh data in a narrow-area mesh obtained by further dividing a wide-area mesh, which is obtained by dividing a certain area by a 3×3 wide-area division pattern, by a 2×2 narrow-area division pattern. That is, it is a schematic diagram which shows the number of terminals for each narrow-area mesh obtained by dividing a certain area by a 6×6 narrow-area division pattern.

FIG. 7(a) shows group 1 indicating narrow-area mesh data in which the number of terminals is totaled in units of narrow-area mesh with the OS type of A and the positioning type of GPS. FIG. 7(b) shows group 2 indicating narrow-area mesh data in which the number of terminals is totaled in units of narrow-area mesh with the OS type of A and the positioning type of Wi-Fi. FIG. 7(c) shows group 3 indicating narrow-area mesh data in which the number of terminals is totaled in units of narrow-area mesh with the OS type of B and the positioning type of GPS. FIG. 7(d) shows group 3 indicating narrow-area mesh data in which the number of terminals is totaled in units of narrow-area mesh with the OS type of B and the positioning type of WIFI. FIG. 7(e) is a schematic diagram which shows wide-area mesh data in which the number of terminals based on network positioning data acquired by the positioning data acquisition unit 101 is totaled in units of wide-area mesh.

Using this, a method of calculating the reliability evaluation for a narrow-area mesh group will be described.

First, the reliability evaluation unit 109 calculates a correlation coefficient of narrow-area mesh data between respective narrow-area mesh groups shown in FIGS. 7(a) to 7(d). The reliability evaluation unit 109 selects a narrow-area mesh group having the correlation coefficient equal to or higher than a predetermined threshold. This correlation coefficient is calculated using, for example, a known calculation method such as cosine similarity. In the present embodiment, the narrow-area mesh groups shown in FIGS. 7(a) to 7(c) are determined to have a high correlation of the narrow-area mesh data with each other, and the narrow-area meshes shown in FIG. 7(d) are determined to have a low correlation with other narrow-area mesh data.

There may be a plurality of sets of narrow-area mesh groups having the correlation coefficient equal to or larger than the threshold, and there may be no correlation between the narrow-area mesh groups in each set. For example, it is assumed that there are groups A to D, groups A and B are correlated and groups C and D are correlated, but there may be no other correlation between groups such as groups A and C not being correlated. In this case, it is preferable to adopt a group having a large number of user terminals in the narrow-area mesh data to increase the number of samples. That is, the number of user terminals in all meshes of groups A and B is compared with the number of user terminals in all meshes of groups C and D, and groups with a larger number of user terminals are adopted.

More specifically, determination of the presence or absence of a correlation between groups will be described as follows.

Group correlated with group A: B
 Group correlated with group B: A
 Group correlated with group C: D
 Group correlated with group D: C
 Groups not correlated with group A: C and D Groups not correlated with group B: C and D
Groups not correlated with group C: A and B
Groups not correlated with group D: A and B As the correlation is ascertained in this manner, it is possible to ascertain that the groups A and B and the groups C and D are in different correlation sets. Then, as described above, it is better to adopt a group of a correlation set that includes a greater number of user terminals.

Instead of making the determination based on the correlation between groups, the determination may be made on the basis of a ratio of the number of user terminals between meshes at the same position between groups. That is, the reliability evaluation unit 109 calculates a ratio in each mesh of the narrow-area mesh data between the groups, and calculates a variance thereof. For example, the narrow-area mesh data of group 1 in FIG. 7 is divided by the narrow-area mesh data of group 2 in units of each mesh. As a result, first, the ratio is calculated in units of each mesh. Then, a variance of this ratio is calculated. When the variance is equal to or less than a predetermined threshold, the group is adopted. As a result, it is possible to select a group for evaluation. Note that the variance equal to or less than the threshold indicates that the narrow-area mesh data has the same degree of coincidence, and an analysis has been performed from the same viewpoint as a correlation analysis.

If there are a plurality of sets of groups having the variances equal to or less than a predetermined value, groups with a great number of user terminals are adopted as described above.

In addition, alternatively, when priority is given to the attribute information of the positioning data in advance, and a plurality of groups are selected, the higher one may be adopted. For example, when it is determined that groups A and C and groups B and D have high correlation, respectively, and group A is set to have high priority of attribute information of the positioning data, groups A and B are adopted.

Figure 8:
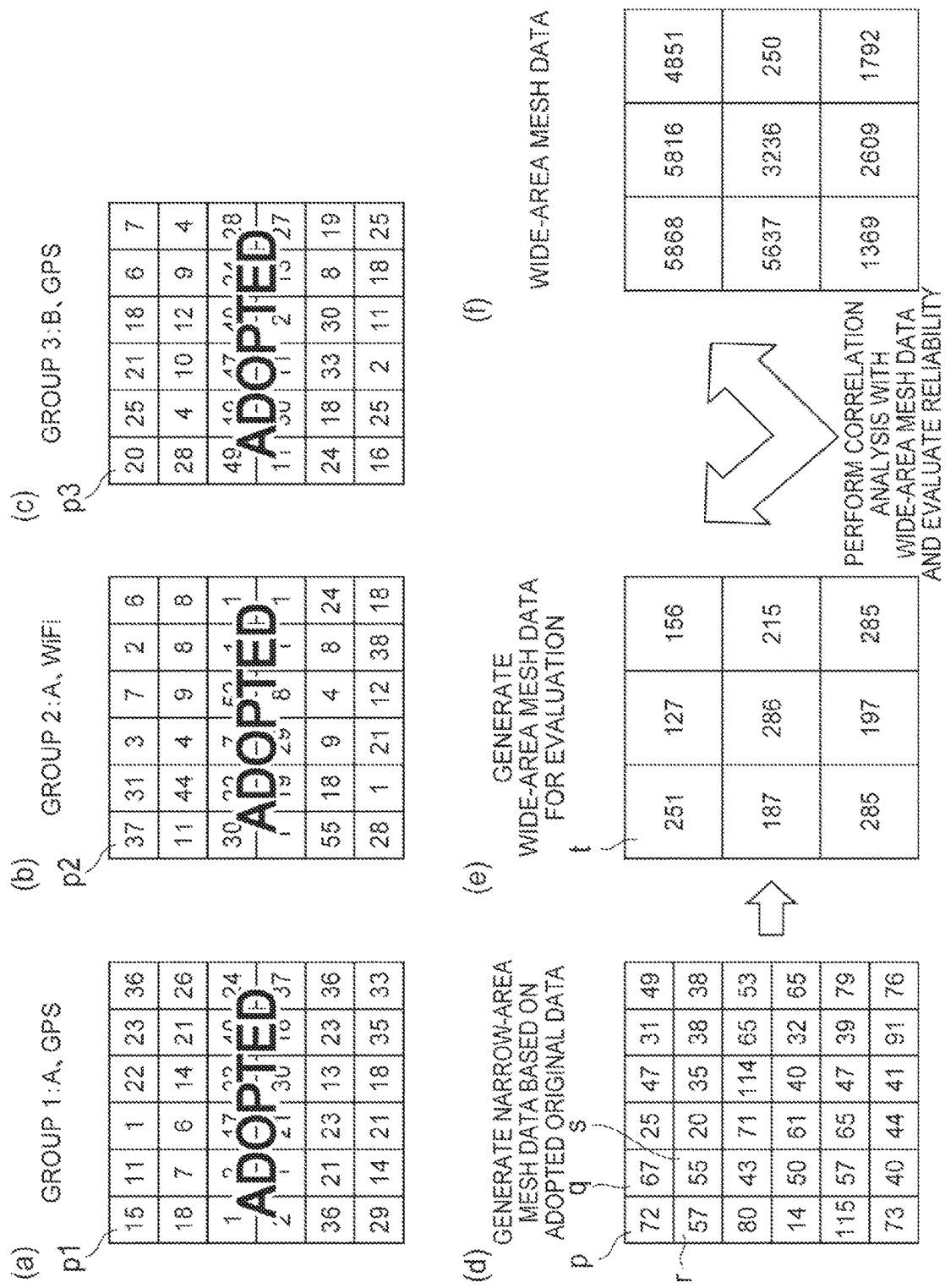
FIGS. 8A-8F are each a diagram which describes a calculation process of wide-area mesh data for evaluation and its evaluation.

Next, the reliability evaluation unit 109 calculates a correlation coefficient between narrow-area mesh data for evaluation obtained by summing respective narrow-area groups and wide-area mesh data. FIG. 8 is a schematic diagram which shows the calculation processing. FIGS. 8(a) to 8(c) show narrow-area mesh groups determined to have high correlation. FIG. 8(d) shows narrow-area mesh data for evaluation. The narrow-area mesh data for evaluation is data in which narrow-area mesh data of respective narrow-area mesh groups determined to have high correlation is totaled for each narrow-area mesh having the same position.

For example, the narrow-area mesh data of a narrow-area mesh p in FIG. 8(d) is a total value obtained by summing the narrow-area mesh data of narrow-area meshes p1 to p3 having the same position in FIGS. 8(a) to 8(c). The same applies to other narrow-area mesh data.

FIG. 8(e) is a schematic diagram which shows wide-area mesh data for evaluation. The wide-area mesh data for evaluation is generated on the basis of the narrow-area mesh data for evaluation. The wide-area mesh data for evaluation is obtained by totaling the narrow-area mesh data for evaluation in units of wide-area mesh.

For example, the wide-area mesh data for evaluation of a wide-area mesh t in FIG. 8(e) is calculated as a total value of narrow-area mesh data indicated by narrow-area meshes p, q, r, and s in FIG. 8(d).

FIG. 8(f) shows wide-area mesh data based on the network positioning data acquired by the positioning data acquisition unit 101. The wide-area mesh data is based on positional information obtained by communication of the user terminal 200, and its population is generally larger than the number of pieces of positional information obtained by performing GPS positioning described above, or the like.

Next, the reliability evaluation unit 109 calculates a correlation between the wide-area mesh data for evaluation (FIG. 8(e)) and the wide-area mesh data based on the network positioning data acquired by the positioning data acquisition unit 101 (FIG. 8(f)). The processing of calculating the correlation coefficient is performed using the cosine similarity as described above. The reliability evaluation unit 109 determines whether to adopt the narrow-area mesh data for evaluation on the basis of whether the correlation coefficient (cosine similarity) is equal to or greater than a predetermined threshold. That is, if the correlation coefficient is equal to or greater than the predetermined value, the number of user terminals of the narrow-area mesh data for evaluation is adopted. If the correlation coefficient is less than the predetermined value, the number is not adopted and next different narrow-area mesh data is acquired. The different narrow-area mesh data is narrow-area mesh data acquired by changing the geographic resolution (making the division pattern finer) or changing the temporal resolution (changing the totalization time unit).

In this manner, the reliability evaluation unit 109 selects a necessary narrow-area mesh group from the generated narrow-area mesh groups, generates narrow-area mesh data for evaluation on the basis of the narrow-area mesh data of the narrow-area mesh group, generates wide-area mesh data for evaluation on the basis of the narrow-area mesh data for evaluation, and evaluates narrow-area mesh data. As a result, narrow-area mesh data with improved statistical reliability can be obtained.

Instead of the processing based on the correlation coefficient, the ratio may be calculated in units of wide-area mesh between the wide-area mesh data for evaluation and the wide-area mesh data, and when the variance thereof is equal to or less than a predetermined value, it may be determined whether to adopt the narrow-area mesh data for evaluation.

Next, the user terminal 200 will be described. The user terminal 200 includes a terminal positioning unit 201, a positioning data accumulation unit 202, and a transmission unit 203.

The terminal positioning unit 201 is a portion that measures the position of the user terminal 200 and, for example, acquires coordinate information (positional information) according to GPS positioning. In addition, there are a positioning method using a WIFI, a positioning method using a beacon, and the like.

The positioning data accumulation unit 202 is a portion that stores positioning data including positional information measured by the terminal positioning unit 201. The positioning data is the same as items shown in FIG. 3(a).

The transmission unit 203 is a portion that transmits the positioning data to the population distribution totalization device 100.

Figure 9:
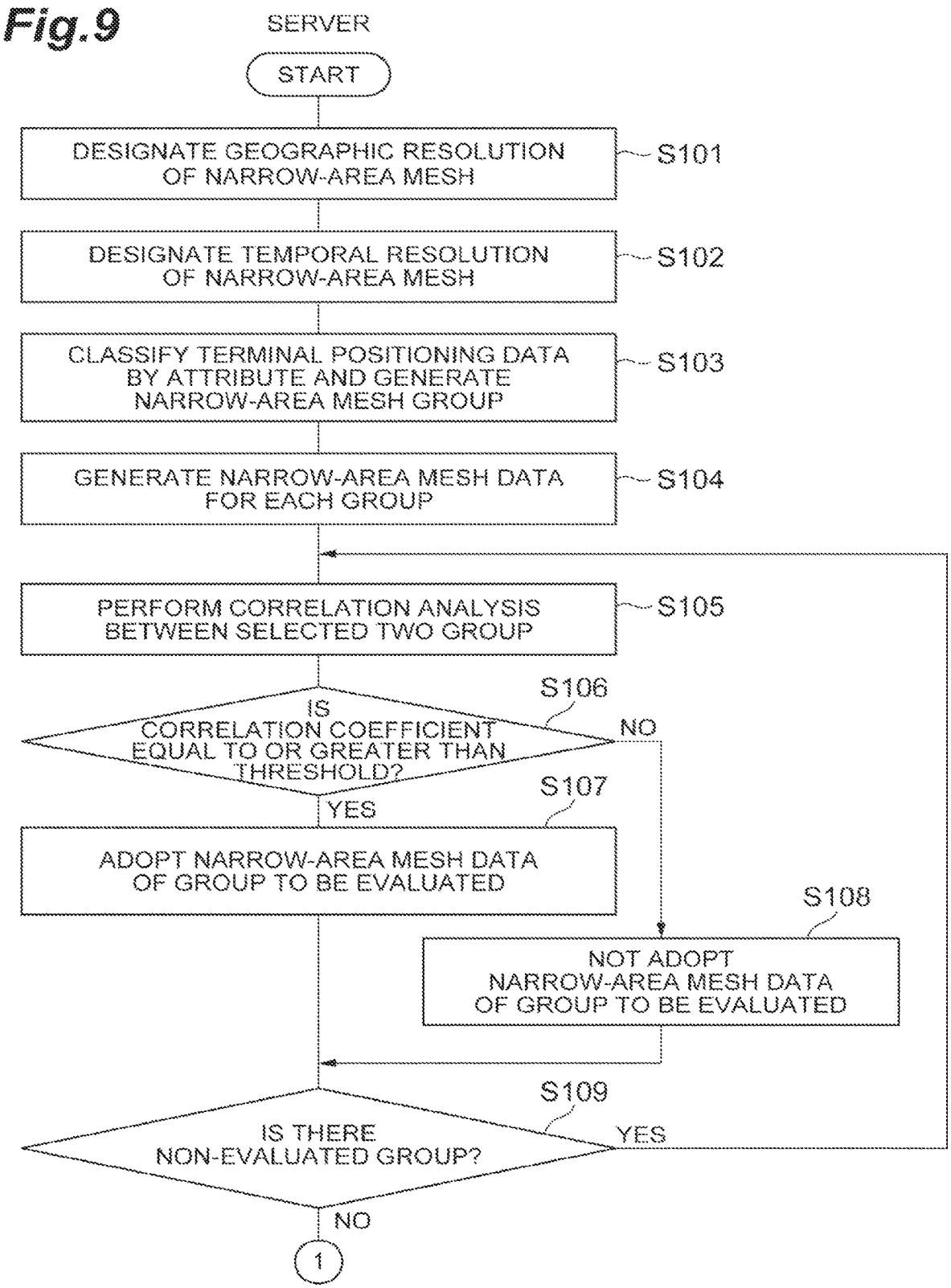
FIG. 9 is a flowchart which shows an operation of a population distribution totalization device 100.
Figure 10:
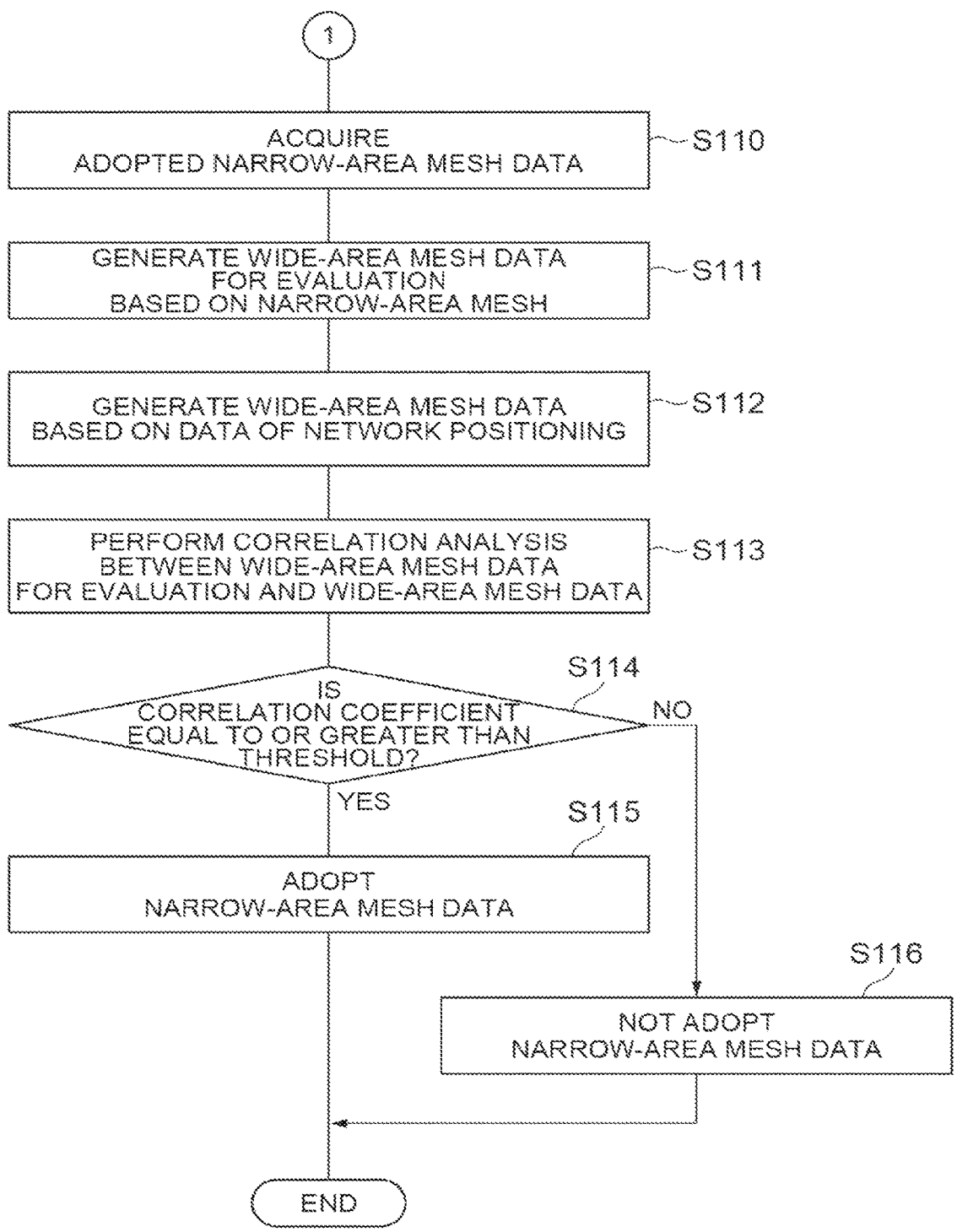
FIG. 10 is a flowchart which shows the operation of the population distribution totalization device 100.

An operation of the population distribution totalization device 100 configured in this manner will be described. FIGS. 9 and 10 are flowcharts which show the operation of the population distribution totalization device 100. In advance, the operator operates the geographic resolution designation unit 105 and the temporal resolution designation unit 106 to designate the geographic resolution and the temporal resolution of a narrow-area mesh (S101 and S102).

The narrow-area mesh group management unit 108 classifies terminal positioning data by each attribute and generates a narrow-area mesh group (S103). For example, a narrow-area mesh group indicating a narrow-area mesh according to a resolution designated in the geographic resolution is generated for each OS type or the like by classifying the data using the OS type of A and the positioning type of GPS or the like.

The narrow-area mesh group management unit 108 totals the number of terminals for each narrow-area mesh in each narrow-area mesh group to generate narrow-area mesh data (S104).

The narrow-area mesh group management unit 108 performs correlation analysis between the narrow-area mesh groups, and calculates a correlation coefficient to evaluate the reliability of each narrow-area mesh group (S105).

The narrow-area mesh group management unit 108 determines whether the correlation coefficient is equal to or greater than a predetermined threshold (S106). If it is determined that the correlation coefficient is equal to or greater than the predetermined threshold, narrow-area mesh data of a narrow-area mesh group to be evaluated is adopted (S107). If it is determined that the correlation coefficient is less than the predetermined threshold, the narrow-area mesh data of the narrow-area mesh group to be evaluated is not adopted (S108). This is repeatedly performed for all combinations of groups to calculate the correlation coefficient (S109). Note that determination of whether to adopt narrow-area mesh data may be performed on the basis of the variance of the ratio in units of mesh instead of the determination based on the correlation coefficient as described above.

Next, the operation will be described with reference to FIG. 10. The narrow-area mesh group management unit 108 acquires the adopted narrow-area mesh data (S110), and generates wide-area mesh data for evaluation based on the narrow-area mesh data (S111).

On the other hand, the narrow-area mesh group management unit 108 acquires network positioning data acquired by the positioning data acquisition unit 101 from the positioning data accumulation unit 102 to generate wide-area mesh data (S112).

Then, the reliability evaluation unit 109 performs a correlation analysis between the wide-area mesh data for evaluation and the wide-area mesh data, and performs reliability evaluation (S113). The reliability evaluation unit 109 determines whether a calculated correlation coefficient is equal to or greater than a threshold (S114), and, if the correlation coefficient is equal to or greater than the threshold, narrow-area mesh which is original data of the wide-area mesh data for evaluation is adopted (S115), and, if the correlation coefficient is less than the threshold, the narrow-area mesh data is not adopted (S116). Note that, as described above, whether to adopt the wide-area mesh data for evaluation (and the original narrow-area mesh data) may be determined on the basis of the variance of the ratio in units of wide-area mesh instead of the determination based on the correlation coefficient.

According to this processing, it is determined whether to adopt the narrow-area mesh data generated by the designated geographic resolution and temporal resolution. When it cannot be adopted, the procedure returns to S101 again, different geographic resolution and temporal resolution are designated to repeatedly perform the processing described above. Note that the geographic resolution and the temporal resolution may be designated at minimum resolutions at first, and the resolutions are designated to gradually increase.

Thereafter, the population distribution estimation unit 110 calculates the number of user terminals (population distribution) in a narrow-area mesh by applying a distribution ratio of the adopted narrow-area mesh data to wide-area mesh data.

According to the processing, it is possible to calculate a population distribution that has secured statistical reliability. Note that it is possible to total the population distribution for each user attribute in the processing described above. In other words, when a gender, an age generation (or age), a place of residence, and hobbies and preferences are stored as user attributes in association with the user ID in advance, and, narrow-area mesh data and wide-area mesh data are generated, it is possible to total the population distribution for each user attribute.

Next, an operation effect of the population distribution totalization device 100 of the present embodiment will be described. The population distribution totalization device 100 of the present embodiment includes a positioning data acquisition unit 101 that acquires detailed positional information indicating the position of a corresponding user terminal measured according to a first method such as GPS among a plurality of user terminals 200, and acquires approximate positional information of a plurality of user terminals measured by the second method such as a positioning method by a network infrastructure, a positioning data accumulation unit 102 that stores detailed positional information and approximate positional information for each user terminal 200, a narrow-area mesh group management unit 108 that generates wide-area mesh data by acquiring the number of user terminals positioned in each predefined wide-area mesh using approximate positional information stored in the positioning data accumulation unit 102, and generates narrow-area mesh data by acquiring the number of user terminals positioned in each of a plurality of narrow-area meshes obtained by dividing a wide-area mesh by a predetermined geographic resolution for each predetermined positional information acquisition pattern using detailed positional information stored in the positioning data accumulation unit 102, a reliability evaluation unit 109 that calculates the reliability of narrow-area mesh data for each positional information acquisition pattern on the basis of the narrow-area mesh data and wide-area mesh data, and a population distribution estimation unit 110 that estimates the number of user terminals in a narrow-area mesh on the basis of narrow-area mesh data and wide-area mesh data according to the reliability.

According to this configuration, narrow-area mesh data can be generated for each predetermined positional information acquisition pattern, and the reliability of the narrow-area mesh data can be evaluated on the basis of the generated narrow-area mesh data and wide-area mesh data. Therefore, narrow-area mesh data with higher reliability can be selected, and the population distribution of a narrow-area mesh can be estimated. In other words, it is possible to calculate a population distribution with high statistical reliability.

In the present embodiment, it is possible to calculate a population distribution with high geographic resolution while maintaining statistical reliability.

In addition, the positioning data accumulation unit 102 stores attribute information indicating the attributes of the detailed positional information in addition to the positional information of the user terminal as detailed positional information, and the positional information acquisition pattern is based on the attribute information, and generates narrow area data. The attributes are, for example, a positioning type and a terminal type.

Generally, a positioning deviation of a position of the positional information differs depending on the positioning attribute, for example, the positioning type or the terminal type, and the positioning deviation of a position differs depending on a positioning situation and a positioning time.

In the present embodiment, by calculating narrow-area mesh data in accordance with a positioning type or a terminal type, it is possible to select the positioning data of groups having the same positioning deviation of a position. Therefore, the statistical reliability can be improved.

In addition, in the population distribution totalization device 100 of the present embodiment, the narrow-area mesh group management unit 108 groups detailed positional information into a plurality of groups on the basis of a positional information acquisition pattern, and generates narrow-area mesh data obtained by totaling the number of detailed positional information for each narrow area in each group. The reliability evaluation unit 109 calculates the reliability of narrow-area mesh data on the basis of narrow-area mesh data for evaluation based on narrow-area mesh data that satisfies a predetermined condition among narrow-area mesh data generated for each group, and wide-area mesh data.

With this configuration, mesh data for evaluation can be generated by combining the narrow-area mesh data that satisfies a predetermined condition (for example, having a high correlation) between groups, and the reliability of the narrow-area mesh data can be evaluated on the basis of the generated mesh data. Therefore, evaluation is performed by using narrow-area mesh data that satisfies a predetermined condition such as a high correlation and enlarging the population, thereby the accuracy for determining the reliability can be improved.

In addition, in the population distribution totalization device 100, the reliability evaluation unit 109 performs a correlation analysis between the narrow-area mesh data for evaluation and the wide-area mesh data to calculate reliability of narrow-area mesh data satisfying a predetermined condition such as a correlation coefficient being higher than a predetermined value, or the like.

More specifically, the reliability evaluation unit 109 selects a plurality of pieces of narrow-area mesh data having a high correlation with each other on the basis of a plurality of pieces of narrow-area mesh data generated for each group, and generates the narrow area data for evaluation by combining the plurality of pieces of narrow-area mesh data.

With this configuration, it is possible to calculate the reliability of the narrow-area mesh data such as whether a relationship between the narrow-area mesh data for evaluation and the wide-area mesh data has satisfied a predetermined condition (high correlation). Therefore, it is possible to select narrow-area mesh data with higher reliability, and to calculate a population distribution with higher reliability and higher accuracy.

Moreover, in the population distribution totalization device 100, if the reliability calculated by the reliability evaluation unit 109 has not satisfied the predetermined condition, the narrow-area mesh group management unit 108 generates narrow-area mesh data again by changing at least one of the geographic resolution indicating a division unit and the temporal resolution that is a totalization time unit.

With this configuration, it is possible to change the resolution and start again, and to generate more appropriate narrow-area mesh data with high reliability. It is effective to change from a fine resolution to a large resolution. For example, if the resolution is set too small, a narrow-area mesh with zero user terminals may appear. When statistical processing is performed using such population distribution data, the statistical processing may be inappropriate, and it may be more convenient for the statistical processing if the population distribution is appropriately varied. Therefore, by increasing the resolution, it is possible to prevent the population distribution from becoming 0 in a narrow-area mesh unit. Conversely, in some cases, it is convenient to reduce the resolution.

In the population distribution totalization device 100, the first method is a method of positioning at a user terminal, and the second method is a method of positioning on a network side. In general, in the method of positioning at a user terminal, the positional information is detailed. On the other hand, in the method of positioning on a network side, the positional information is rough, but the population parameter can be increased. When a population distribution is calculated, it is possible to calculate a population distribution with high accuracy by using information obtained by the method of positioning on the network side.

The block diagram used in the description of the above embodiment shows blocks in functional units. These functional blocks (components) are realized by an arbitrary combination of at least one of hardware and software. In addition, a method of realizing each functional block is not particularly limited. That is, each functional block may be realized using one device physically or logically coupled, or may be realized by directly or indirectly (for example, using a wired or wireless method, or the like) connecting two or more devices physically or logically separated and using a plurality of these devices. The functional block may be realized by combining software with one device or the plurality of devices.

Functions include determination, decision, assessment, computation, calculation, processing, derivation, investigation, search, confirmation, reception, transmission, output, access, resolution, selection, selection, establishment, comparison, assumption, expectation, consideration, broadcasting, notifying, communicating, forwarding, configuring, reconfiguring, allocating, mapping, assigning, and the like, but the present invention is not limited to thereto. For example, a functional block (component) that makes a transmission function is referred to as a transmitting unit or a transmitter. In any case, the realization method is not particularly limited as described above.

Figure 11:
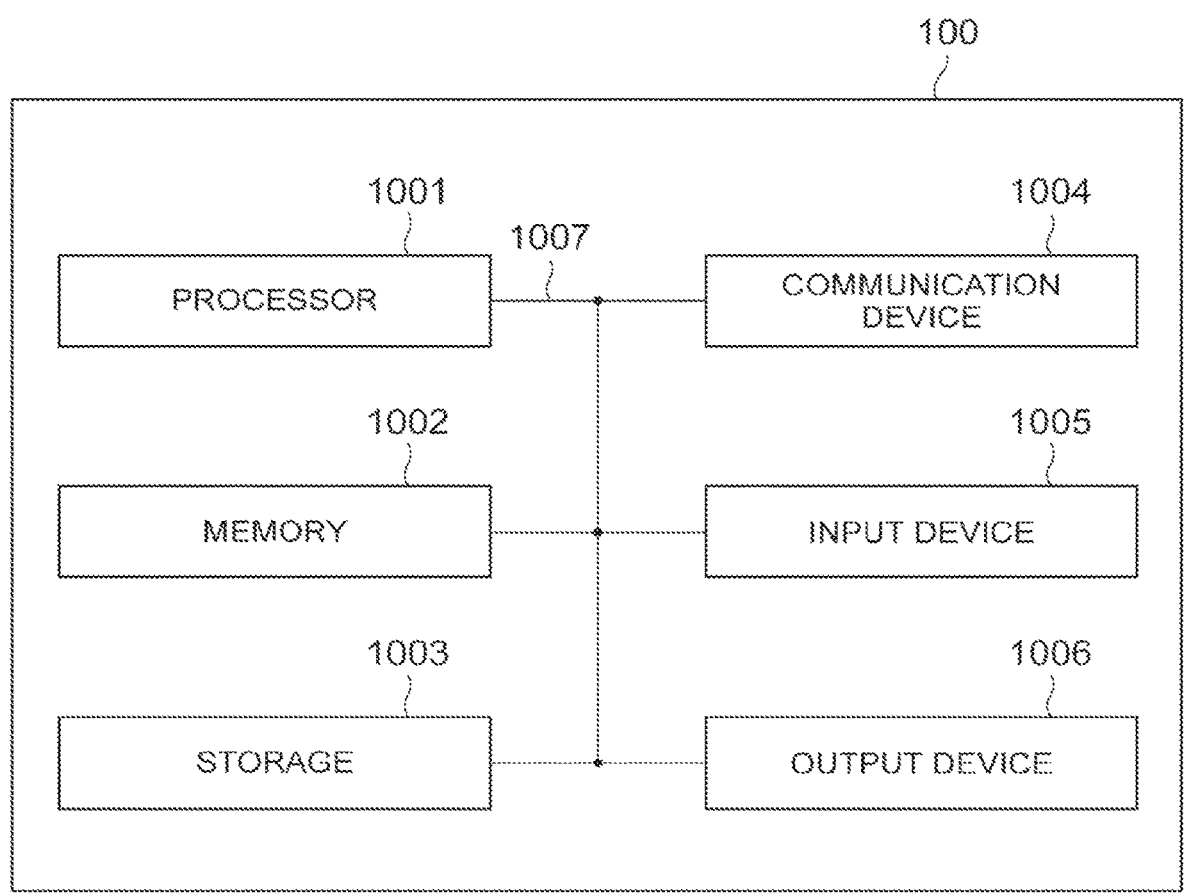
FIG. 11 is a diagram which shows an example of a hardware configuration of the population distribution totalization device 100 according to an embodiment of the present disclosure.

For example, the population distribution totalization device 100 according to an embodiment of the present disclosure may function as a computer that performs the processing of the population distribution totalization method according to the present disclosure. FIG. 11 is a diagram which shows an example of a hardware configuration of the population distribution totalization device 100 according to an embodiment of the present disclosure. The population distribution totalization device 100 described above may be physically configured as a computer device including a processor 1001, a memory 1002, a storage 1003, a communication device 1004, an input device 1005, an output device 1006, a bus 1007, and the like.

In the following description, the term "device" can be read as a circuit, a device, a unit, or the like. The hardware configuration of the population distribution totalization device 100 may be configured to include one or more of the devices shown in FIG. 11, or may be configured not to include some of the devices.

The functions of the population distribution totalization device 100 are realized by the processor 1001 performing an arithmetic operation by reading predetermined software (program) on hardware such as the processor 1001 and the memory 1002, and controlling communication by the communication device 1004 or controlling at least one of reading and writing of data in the memory 1002 and the storage 1003.

The processor 1001 controls, for example, an entire computer by operating an operating system. The processor 1001 may be configured by a central processing unit (CPU) including an interface with a peripheral device, a control device, an arithmetic device, a register, and the like. For example, the wide-area mesh generation unit 103 described above, the narrow-area mesh generation unit 104, the narrow-area mesh group management unit 108, the reliability evaluation unit 109, the population distribution estimation unit 110, and the like described above may be realized by the processor 1001.

The processor 1001 reads a program (program code), a software module, data, and the like from at least one of the storage 1003 and the communication device 1004 to the memory 1002, and executes various types of processing according to these. As the program, a program that causes a computer to execute at least a part of the operations described in the embodiment above is used. For example, the narrow-area mesh group management unit 108, the reliability evaluation unit 109, and the like of the population distribution totalization device 100 may be realized by a control program stored in the memory 1002 and operated by the processor 1001, and other functional blocks may also be realized similarly. Although it has been described that the various types of processing described above are executed by one processor 1001, the processing may be executed simultaneously or sequentially by two or more processors 1001. The processor 1001 may be implemented by one or more chips. The program may be transmitted from a network via a telecommunication line.

The memory 1002 is a computer-readable recording medium, and may be configured by at least one of a read only memory (ROM), an erasable programmable ROM (EPROM), an electrically erasable programmable ROM (EEPROM), a random access memory (RAM), and the like. The memory 1002 may be referred to as a register, a cache, a main memory (main storage device), or the like. The memory 1002 can store a program (program code), a software module, and the like that can be executed to implement the population distribution totalization method according to an embodiment of the present disclosure.

The storage 1003 is a computer-readable recording medium and may be, for example, configured by at least one of an optical disk such as a compact disc (CD-ROM), a hard disk drive, a flexible disk, a magneto-optical disc (for example, a compact disk, a digital versatile disk, a Blu-ray (registered trademark) disk), a smart card, a flash memory (for example, a card, a stick, a key drive), a floppy (registered trademark) disk, a magnetic strip, and the like. The storage 1003 may be referred to as an auxiliary storage device. The storage medium described above may be, for example, a data base including at least one of the memory 1002 and the storage 1003, a server, or any other suitable medium.

The communication device 1004 is hardware (a transmitting and reception device) for performing communication between computers via at least one of a wired network and a wireless network, and is also referred to as, for example, a network device, a network controller, a network card, a communication module, or the like. The communication device 1004 is configured to include a high-frequency switch, a duplexer, a filter, a frequency synthesizer, and the like to realize at least one of, for example, a frequency division duplex (FDD) and a time division duplex (TDD). For example, the portion and the like for transmitting and receiving the positioning data described above may be realized by the communication device 1004. The communication device 1004 may be implemented in a physically or logically separated manner.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs an output to the outside. Note that the input device 1005 and the output device 1006 may be an integrated constituent (for example, a touch panel).

In addition, devices such as the processor 1001 and the memory 1002 are connected by a bus 1007 for communicating information. The bus 1007 may be configured using a single bus, or may be configured using a different bus for each device.

In addition, the population distribution totalization device 100 may be configured to include hardware such as a microprocessor, a digital signal processor (DSP), an application specific integrated circuit (ASIC), a programmable logic device (PLD), and a field programmable gate array (FPGA), and some or all of the functional blocks may be realized by the hardware. For example, the processor 1001 may be implemented using at least one of these pieces of hardware.

Information notification is not limited to the aspect or embodiment described in the present disclosure, and may be performed using another method. For example, information notification implemented by physical layer signaling (for example, downlink control information (DCI), uplink control information (UCI)), upper layer signaling (for example, radio resource control (RRC) signaling, medium access control (MAC) signaling, notification information (master information block (MIB), system information block (SIB))), other signals, or a combination of these. The RRC signaling may be referred to as an RRC message, and may be, for example, an RRC connection set-up message, an RRC connection reconfiguration message, or the like.

Each aspect or embodiment described in the present disclosure may be applied to at least one of a system using long term evolution (LTE), LTE-advanced (LTE-A), SUPER 3G, IMT-Advanced, a 4th generation mobile communication system (4G), and a 5th generation mobile communication system (5G), a future radio access (FRA), new radio (NR), W-CDMA (registered trademark), GSM (registered trademark), CDMA2000, a ultra mobile broadband (UMB), IEEE 802.11 (Wi-Fi (registered trademark)), IEEE 802.16 (WiMAX (registered trademark)), IEEE 802.20, a ultra-wideband (UWB), Bluetooth (registered trademark), and other suitable systems and a next-generation system extended on the basis of these systems. Moreover, a plurality of systems may be combined (for example, a combination of at least one of LTE and LTE-A with 5G) and applied.

The processing procedure, sequence, flowchart, and the like of each aspect or embodiment described in the present disclosure may be changed in order as long as there is no contradiction. For example, the methods described in the present disclosure present various steps of elements by using an exemplary order, and the present invention is not limited to the presented specific order.

The specific operation described as being performed by a base station in the present disclosure may be performed by an upper node in some cases. In a network consisting of one or more network nodes having the base station, it is apparent that various operations performed for communication with terminals can be performed by the base station and at least one of other network nodes other than the base station (for example, MME, S-GW, or the like are considered, but the present invention is not limited thereto). In the above description, a case in which the number of other network nodes other than the base station is one is exemplified, but there may be a combination of a plurality of other network nodes (for example, MME and S-GW).

Information and the like may be output from an upper layer (or a lower layer) to a lower layer (or an upper layer). It may also be input and output via a plurality of network nodes.

The input or output information may be stored in a specific place (for example, memory) or may be managed using a management table. The input or output information or the like can be overwritten, updated, or added. The output information or the like may be deleted. The input information or the like may be transmitted to another device.

The determination may be performed according to a value (0 or 1) represented by 1 bit, may be performed by a Boolean value (Boolean: true or false), or may also be performed by a comparison of numerical values (for example, a comparison with a predetermined value).

Each aspect or embodiment described in the present disclosure may be used alone, may be used in combination, or may be used by switching n accordance with execution. In addition, the notification of predetermined information (for example, the notification of a fact that it is "λ") is not limited to being explicitly performed, and may be performed implicitly (for example, without performing the notification of the predetermined information).

While the present disclosure has been described above in detail, it is apparent to those skilled in the art that the present disclosure is not limited to the embodiments described in the present disclosure. The present disclosure can be implemented as modified and altered forms without departing from the gist and scope of the present disclosure defined by description in the appended claims. Accordingly, description in the present disclosure is intended for exemplary explanation, and does not have any restrictive meaning for the present disclosure.

Regardless of whether software is called software, firmware, middleware, microcode, hardware description language, or another name, software can be widely interpreted to refer to commands, a command set, codes, code segments, program codes, a program, a sub program, a software module, an application, a software application, a software package, a routine, a sub routine, an object, an executable file, an execution thread, an order, a function, or the like.

Software, commands, information, and the like may be transmitted and received via a transmission medium. For example, when software is transmitted from a web site, a server, or another remote source using at least one of a wired technology (a coaxial cable, an optical fiber cable, a twisted-pair wire, or a digital subscriber line (DSL)) and a wireless technology (infrared rays, microwaves, or the like), at least one of the wired technology and the wireless technology is included in the definition of the transmission medium.

Information, signals, and the like described in the present disclosure may be represented using one of various different techniques. For example, data, an instruction, a command, information, a signal, a bit, a symbol, a chip, or the like which can be mentioned in the overall description may be represented by a voltage, a current, an electromagnetic wave, a magnetic field or magnetic particles, a photo field or photons, or an arbitrary combination thereof.

Note that the terms described in the present disclosure and the terms necessary for understanding the present disclosure may be substituted by terms having the same or similar meanings. For example, at least one of a channel and a symbol may be a signal (signaling). In addition, the signal may be a message. Moreover, a component carrier (CC) may be referred to as a carrier frequency, a cell, a frequency carrier, or the like.

The terms "system" and "network" used in the present disclosure are interchangeably used.

In addition, information, parameters, and the like described in the present disclosure may be represented by absolute values, may be represented by values relative to a predetermined value, or may be represented by other corresponding information. For example, radio resources may be indicated by indices.

Names which are used for the parameters described above are not restrictive in any viewpoint. Furthermore, expressions or the like using the parameters may be different from the expressions which are explicitly disclosed in the present disclosure. Since various channels (for example, a PUCCH and a PDCCH) and information elements can be identified by all appropriate names, various names given to these various channels and information elements are not restrictive in any viewpoint.

A mobile station may be referred to as, by those skilled in the art, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

The term "determining" or "determination" which is used in the present disclosure may include various types of operations. The term "determining" or "determination" may include, for example, cases in which judging, calculating, computing, processing, deriving, investigating, looking up (for example, looking up, search, or inquiry in a table, a database, or another data structure), and ascertaining are considered to be "determined," and the like. The term "determining" or "determination" may include cases in which receiving (for example, receiving information), transmitting (for example, transmitting information), input, output, and accessing (for example, accessing data in a memory) are considered to be "determined," and the like. In addition, the term "determining" or "determination" may include cases in which resolving, selecting, choosing, establishing, comparing, and the like are considered to be "determined." That is, the term "determining" or "determination" can include cases in which a certain operation is considered to be "determined." Moreover, "determining (determination)" may be read as "assuming," "expecting," "considering," or the like.

The expression "on the basis of" used in the present disclosure does not mean "on the basis of only" unless otherwise described. In other words, the expression "on the basis of" means both "on the basis of only" and "on the basis of at least."

Any reference to elements having names such as "first" and "second" which are used in the present disclosure does not generally limit amounts or an order of the elements. These names can be used as a convenient method to distinguish two or more elements in the present disclosure. Accordingly, a reference to first and second elements does not mean that only two elements are employed or that the first element has to precede the second element in any form.

When the terms "include," "including," and modifications thereof are used in the present disclosure, these terms are intended to be comprehensive similar to the term "comprising." The term "or" which is used in the present disclosure is not intended to be an exclusive logical sum.

In the present disclosure, when articles are added by translation, for example, a, an, and the in English, the present disclosure may include that nouns following these articles are plural.

In the present disclosure, the term "A and B are different" may mean that "A and B are different from each other. Note that the term may mean that "A and B are different from C." The terms such as "separate" and "coupled" may be translated similarly to "different."

REFERENCE SIGNS LIST

100 Population distribution totalization device
101 Positioning data acquisition unit
102 Positioning data accumulation unit
103 Wide-area mesh generation unit
104 Narrow-area mesh generation unit
105 Geographic resolution designation unit
106 Temporal resolution designation unit
107 Resolution management table
108 Narrow-area mesh group management unit
108a Narrow-area mesh group management table
108b Narrow-area mesh data management table
108c Wide-area mesh data management table
109 Reliability evaluation unit
110 Population distribution estimation unit
200 User terminal
201 Terminal positioning unit
202 Positioning data accumulation unit
203 Transmission unit
250 Base station
300 Positional information server

The invention claimed is:

1. A population distribution aggregation and calculation device comprising:
processing circuitry configured to
generate narrow area data by acquiring a number of user terminals positioned in each of a plurality of narrow areas obtained by dividing a predefined wide area by a predetermined geographic resolution for each predetermined positional information acquisition pattern using positional information indicating a position of a corresponding user terminal measured among a plurality of user terminals;
calculate reliability of the narrow area data for each of the predetermined positional information acquisition pattern on the basis of wide area data indicating the number of user terminals positioned in each of the predefined wide area and the narrow area data; and
estimate the number of user terminals in the narrow area on the basis of the narrow area data and the wide area data according to the reliability.

2. The population distribution aggregation and calculation device according to claim 1, wherein the positional information acquisition pattern is based on attribute information indicating an attribute of positional information of the plurality of user terminals.

3. The population distribution aggregation and calculation device according to claim 2, wherein the attribute information includes at least one of a positioning type and a terminal type.

4. The population distribution aggregation and calculation device according to claim 1,
wherein the processing circuitry
groups the positional information into a plurality of groups on the basis of the positional information acquisition pattern and generates narrow area data obtained by totaling the number of pieces of positional information of each narrow area for each group, and
calculates the reliability of the narrow area data on the basis of the narrow area data for evaluation based on narrow area data satisfying a predetermined condition among the narrow area data generated for each of the group and the wide area data.

5. The population distribution aggregation and calculation device according to claim 4, wherein the processing circuitry calculates the reliability of the narrow area data satisfying the predetermined condition by determining a degree of coincidence between the narrow area data for evaluation and the wide area data.

6. The population distribution aggregation and calculation device according to claim 4,
wherein the processing circuitry selects a plurality of pieces of narrow area data with a high degree of coincidence on the basis of a plurality of pieces of narrow area data generated for each group of the plurality of groups, and generates the narrow area data for evaluation by combining the plurality of pieces of narrow area data.

7. The population distribution aggregation and calculation device according to claim 1,
wherein, when the reliability calculated by the processing circuitry does not satisfy a predetermined condition, the processing circuitry changes at least one of a geographic resolution indicating a division unit and a temporal resolution that is a totalization time unit, and generates the narrow area data again.

8. The population distribution aggregation and calculation device according to claim 1,
wherein the narrow area data is generated on the basis of a method of positioning by a user terminal, and
the area data is generated on the basis of a method of positioning by a network side.

9. The population distribution aggregation and calculation device according to claim 2,
wherein the processing circuitry
groups the positional information into a plurality of groups on the basis of the positional information acquisition pattern and generates narrow area data obtained by totaling the number of pieces of positional information of each narrow area for each group of the plurality of groups, and
calculates the reliability of the narrow area data on the basis of the narrow area data for evaluation based on narrow area data satisfying a predetermined condition among the narrow area data generated for each group and the wide area data.

10. The population distribution aggregation and calculation device according to claim 3,
wherein the processing circuitry
groups the positional information into a plurality of groups on the basis of the positional information acquisition pattern and generates narrow area data obtained by totaling the number of pieces of positional information of each narrow area for each group of the plurality of groups, and calculates reliability of the narrow area data on the basis of narrow area data for evaluation based on narrow area data satisfying a predetermined condition among the narrow area data generated for each group of the plurality of groups and the wide area data.

11. The population distribution aggregation and calculation device according to claim 2, wherein, when the reliability calculated by the processing circuitry does not satisfy a predetermined condition, the processing circuitry changes at least one of a geographic resolution indicating a division unit and a temporal resolution that is a totalization time unit, and generates the narrow area data again.

12. The population distribution aggregation and calculation device according to claim 3, wherein, when the reliability calculated by the processing circuitry does not satisfy a predetermined condition, the processing circuitry changes at least one of a geographic resolution indicating a division unit and a temporal resolution that is a totalization time unit, and generates the narrow area data again.

13. The population distribution aggregation and calculation device according to claim 4, wherein, when the reliability calculated by the processing circuitry not satisfy a predetermined condition, the processing circuitry changes at least one of a geographic resolution indicating a division unit and a temporal resolution that is a totalization time unit, and generates the narrow area data again.

14. The population distribution aggregation and calculation device according to claim 2, wherein the narrow area data is generated on the basis of a method of positioning by a user terminal, and the area data is generated on the basis of a method of positioning by a network side.

15. The population distribution aggregation and calculation device according to claim 3, wherein the narrow area data is generated on the basis of a method of positioning by a user terminal, and the area data is generated on the basis of a method of positioning by a network side.

16. The population distribution aggregation and calculation device according to claim 4, wherein the narrow area data is generated on the basis of a method of positioning by a user terminal, and the area data is generated on the basis of a method of positioning by a network side.

\* \* \* \* \*